(12) United States Patent  (10) Patent No.: US 6,253,445 B1
Yoon  (45) Date of Patent: Jul. 3, 2001

(54) PLANAR THIN FILM HEAD AND METHOD FOR FORMING A GAP OF A PLANAR THIN FILM MAGNETIC HEAD

(75) Inventor: Woo-Young Yoon, Kyongsangbuk-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/256,349

(22) Filed: Feb. 24, 1999

(30) Foreign Application Priority Data

Feb. 24, 1998 (KR) .................................................. 98-5776

(51) Int. Cl.$^7$ .................................................. H01C 1/02
(52) U.S. Cl. .................................. 29/603.14; 29/603.18; 29/603.15; 29/603.11; 29/603; 360/119
(58) Field of Search ........................... 29/603.11, 603.14, 29/603.15, 603.18; 360/119, 120, 121, 125–127

(56) References Cited

U.S. PATENT DOCUMENTS

| | | |
|---|---|---|
| 4,601,099 | 7/1986 | Nishiyama . |
| 4,639,289 | 1/1987 | Lazzari . |
| 4,670,972 * | 6/1987 | Sakakima ................................ 29/603 |
| 4,837,924 * | 6/1989 | Lazzari ................................... 29/603 |
| 4,942,490 | 7/1990 | Lehureau . |
| 4,947,541 * | 8/1990 | Toyoda et al. ......................... 29/603 |
| 4,949,207 * | 8/1990 | Lazzari ................................... 360/119 |
| 5,062,196 * | 11/1991 | Deroux-Dauphin .................. 29/603 |
| 5,090,111 | 2/1992 | Lazzari . |
| 5,168,408 | 12/1992 | Lazzari . |
| 5,224,260 * | 7/1993 | Fedeli .................................... 29/603 |
| 5,274,521 | 12/1993 | Miyauchi et al. . |
| 5,563,754 | 10/1996 | Gray et al. . |
| 5,566,442 * | 10/1996 | Gaud ................................. 29/603.14 |
| 5,604,973 * | 2/1997 | Gaud ................................. 29/603.15 |
| 5,737,825 | 4/1998 | Gray et al. . |
| 5,754,377 | 5/1998 | Gray et al. . |
| 5,801,909 | 9/1998 | Gray et al. . |

* cited by examiner

*Primary Examiner*—Lee Young
*Assistant Examiner*—Sean Smith
(74) *Attorney, Agent, or Firm*—Robert E. Bushnell, Esq.

(57) ABSTRACT

A method for forming a gap of a planar thin film magnetic head and a planar thin film magnetic head formed thereby, includes a photoresist having a stepped surface is formed at one side from the center of a gap spacer pedestal. Also, a gap spacer of a diamond-like carbon material for forming the gap is formed at a side well of the photoresist, and one side of an upper pole piece is formed with a magnetic material over the other side from the center of the gap spacer pedestal. Further, the photoresist is etched and the other side of the upper pole piece is formed with a magnetic material over the exposed gap spacer pedestal.

25 Claims, 4 Drawing Sheets

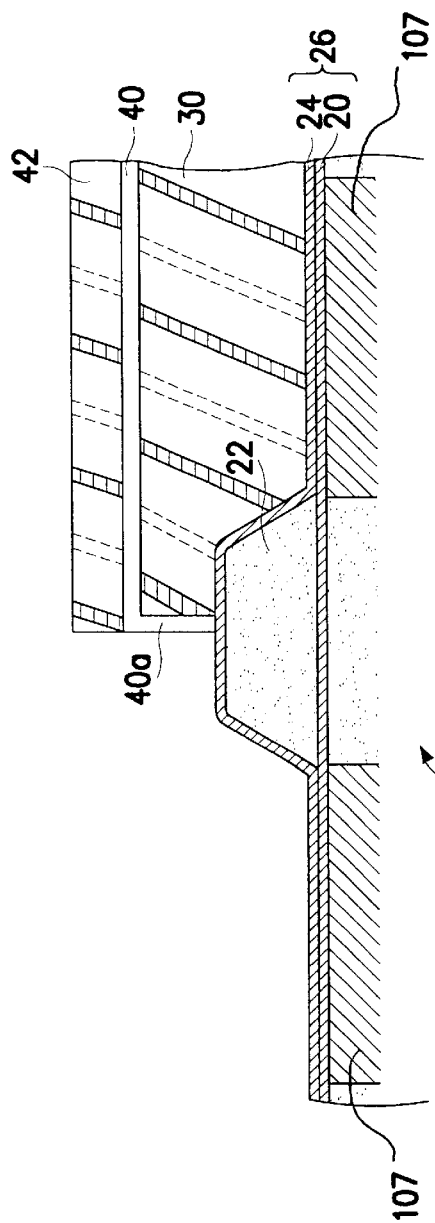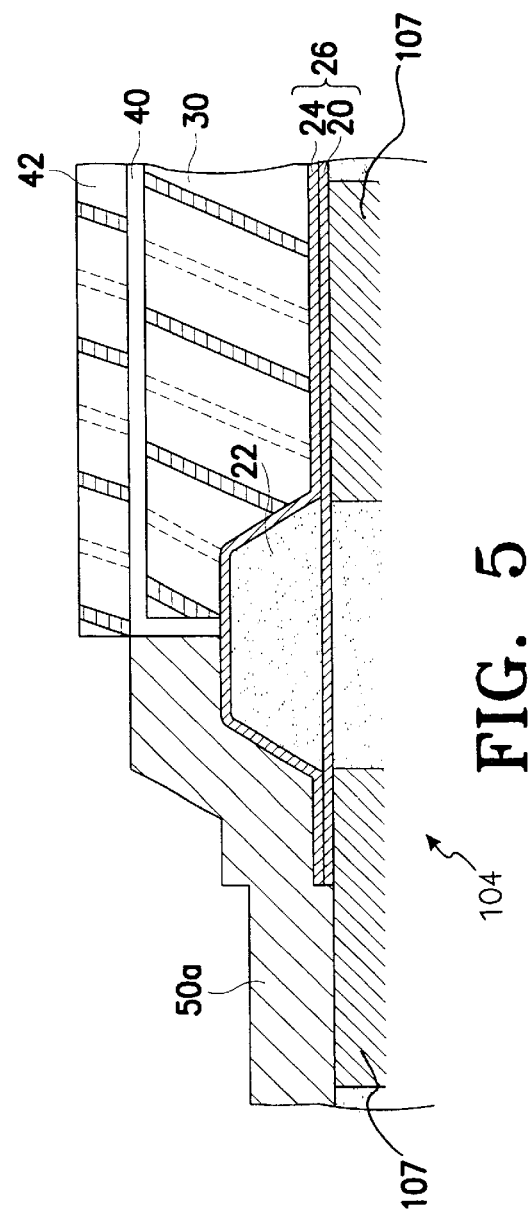

PLANAR THIN FILM HEAD AND METHOD FOR FORMING A GAP OF A PLANAR THIN FILM MAGNETIC HEAD

CLAIM OF PRIORITY

This application makes reference to, incorporates the same herein, and claims all benefits accruing under 35 U.S.C. §119 from an application for METHOD FOR FORMING A GAP OF A PLANAR HEAD earlier filed in the Korean Industrial Property Office of Feb. 24, 1998 and there duly assigned Serial No. 5776/1998.

BACKGROUND OF THE INVENTION

1. Field of the Invention

The present invention relates to a magnetic read/write head, and more particularly, to a method for forming a gap of a planar silicon head which is a planar thin film magnetic head.

2. Description of the Related Art

A planar silicon head, which is used as one type of a magnetic read/write head in a magnetic read/write device such as a hard disk drive, has been of interest because it has a lower inductance than a general inductive head and thus it can be substituted for the inductive head. Existing heads mostly depend on pseudo contact in order to satisfy a frequency demanded. However, the planar silicon head maintains a flying height at about 1.8 $\mu$m which is much higher than the pseudo contact and has almost the same performance as the general head depending on the pseudo contact.

A planar thin film magnetic head and method for manufacturing the same are disclosed, for example, in U.S. Pat. No. 4,949,207, issued Aug. 14, 1990 to Jean-Pierre Lazzari, entitled PLANAR STRUCTURE THIN FILM MAGNETIC HEAD. In U.S. Pat. No. 4,949,207, it is disclosed that a recess is etched in a substrate and is filled by a magnetic film. A coil is formed in an insulating film and magnetic contact pads are formed. Two magnetic films are disclosed to be formed in an insulating film and then in a hard film are formed two pole pieces separated by an amagnetic spacer. In U.S. Pat. No. 4,949,207, in order to form a gap of a thin film magnetic head at the top of an insulation layer situated between two separated magnetic layers, the insulation layer (to be etched later on) deposited to form a vertical well for forming the gap is used as a spacer side well, and the two magnetic layers separated by the spacer are formed at the same time. However, since there is a poor affinity between the material of the gap and the material of an upper pole piece, the gap of the planar thin film magnetic head can increase and it can be difficult to form an accurate shape. Moreover, since the two separated magnetic layers are simultaneously formed, the spacer for forming the gap can be curved or broken.

A planar silicon head includes a magnetic yoke having an upper pole piece (UPP), a concentrator, a pillar and a lower pole piece (LPP) formed on a substrate. The material of the magnetic yoke is permalloy (NiFe) of a magnetic material. The pillar of the magnetic yoke is wound with a coil. A read/write gap for reading and writing data is formed between pole tips of the two separated upper pole pieces (UPPs). A diamond-like carbon (DLC) coated layer is formed at the upper portions of the read/write gap and the upper pole pieces (UPPs). The back side of the silicon substrate has head connectors for electrically connecting the head to an external device. Bumps connected to a suspension of an actuator are formed at the head connectors, respectively.

To manufacture the planar silicon head, four processes are typically needed: a drilling process, an electro-plating process, a gap forming process, and a bump process. The drilling process is for drilling holes in the silicon substrate to form an electrode. The electroplating process is for implementing electroplating to form the upper pole piece (UPP), the concentrator, the pillar, the lower pole piece (LPP), etc. The gap forming process is for forming the gap. The bump process is for forming the bumps at the back of the head for the electrical connection of the silicon head.

However, the planar silicon head can still have problems, in that since an oxide spacer is formed at the side well of a thick photoresist and then the permalloy is deposited around the spacer at a time by a permalloy electroplating process to form the upper pole piece (UPP), the spacer can be curved or broken. Furthermore, in that the material of the gap is an oxide layer, the gap can be contaminated by its properties. Also, the width of the gap can be enlarged under typical temperature and humidly, 46° C., 85% for example, and the length thereof, as a result, is not necessarily uniform.

U.S. Pat. No. 4,639,289 to Jean-Pierre Lazzari, entitled PROCESS FOR PRODUCING A MAGNETIC READ-WRITE HEAD AND HEAD OBTAINED BY THIS PROCESS, discloses a first magnetic material film deposited on a support, a groove etched in the first magnetic film which is shaped like a figure eight, and a double coil formed and wound respectively around the two central pole pieces. An insulating material layer is disclosed as being deposited and etched in step form, the step having a side facing the cental channel. A magnetic film is deposited on the thus etched step, and the film is etched so as to only leave a wall perpendicular to the plane of the films. This is followed by the deposition of a magnetic film and then a protective layer, the assembly being divided off so as to expose two pole pieces separated by an air gap.

U.S. Pat. No. 4,837,924 to Jean-Pierre Lazzari, entitled PROCESS FOR THE PRODUCTION OF PLANAR STRUCTURE THIN FILM MAGNETIC HEADS, discloses a process for producing a planar structure thin film magnetic head wherein a recess is etched in a substrate and is filled by a magnetic film. It is disclosed that a coil is formed in an insulating film and magnetic contact pads are formed. Two magnetic films are disclosed as being formed in an insulating film and then in a hard film are formed two pole pieces separated by a magnetic spacer.

U.S. Pat. No. 4,942,490 to Jean-Claude Lehureau, entitled THIN LAYER MAGNETIC READ/WRITE HEAD, discloses a thin layer magnetic read/write head formed on a substrate in such a manner that a first magnetic pole has a flank which forms a first angle with the side of the substrate and a second magnetic pole has a second flank which is substantially parallel to the first flank. The two flanks are disclosed as being separated by a layer of a magnetic material in order to produce a device which can be especially applied to magnetic tape write/read structures.

U.S. Pat. No. 5,090,111 to Jean-Pierre Lazzari, entitled PROCESS FOR PRODUCING A MAGNETIC RECORDING HEAD, discloses a rectangular parallelepiped having a width of approximately 1 micron and a height of several microns, with separation by an amagnetic spacer.

U.S. Pat. No. 5,168,408 to Jean-Pierre Lazzari, entitled MAGNETIC READING AND WRITING HEAD WITH MAGNETORESISTANT ELEMENT, discloses that in order to improve the sensitivity of the head when reading, without excessively reducing its efficiency when writing, the magnetic circuit used is left open. It is disclosed that the reading flux then re-closes, essentially across the magnetoresistant element (MR).

U.S. Pat. No. 5,274,521 to Teiichi Miyauchi et al., entitled PLANAR THIN FILM MAGNETIC HEAD, disclose a planar thin film magnetic head wherein an axis of easy magnetization in the vicinity of a magnetic gap of a magnetic yoke is forcibly made coincident with the direction of a track width by a magnetic field due to current flowing in a conductor layer. Accordingly, even though the track width is small, a high magnetic permeability, low Barkhausen noise and linear responsiveness can be realized to thereby improve the sensitivity, output and linearity. In another aspect, it is disclosed that a throat portion is eliminated from a thin film magnetic core forming a magnetic gap. The thin film magnetic core is disclosed as being configured such that a pair of magnetic members constituting the magnetic core are diverged from the magnetic gap so that a divergent angle .theta., of first opposite side edges of the magnetic members, from a direction of the gap length of the magnetic gap, is set to the range of $30°<=.theta.<=80°$, and the magnetic members are disclosed as having second opposite side edges extending in substantially parallel to the direction of the gap length of the magnetic gap. Accordingly, it is disclosed even though a track width is reduced less than 10 $\mu$m, adjoining crosstalk or off track crosstalk can be avoided to thereby realize low-noise and high quality reproduction and improve the operating characteristics.

U.S. Pat. No. 5,563,754 to Robert G. Gray et al., entitled THIN FILM MAGNETIC HEAD INCLUDING A DURABLE WEAR LAYER AND GAP STRUCTURE, disclose a thin film magnetic head in which a magnetic yoke assembly is built up, layer by layer, atop a substrate using semiconductor thin film techniques. A lower yoke assembly is disclosed as being first fabricated including a lower magnetic layer situated on the substrate and first and second side poles are built up vertically from the ends of the lower magnetic layer. An insulative pedestal surrounded by a frame is formed at the top of the lower yoke assembly and extends above the uppermost lateral plane of the yoke assembly. A diamond-like carbon (DLC) wear layer is deposited atop the pedestal. It is disclosed that first and second pole wells are excavated in the DLC layer so as to expose the first and second side poles therebelow and to form a DLC gap region between the first and second side poles. First and second magnetic poles are then formed in the first and second pole wells, respectively.

U.S. Pat. No. 5,737,825 to Robert G. Gary et al., entitled METHOD OF MAKING THIN FILM MAGNETIC HEAD INCLUDING A DURABLE WEAR LAYER AND GAP STRUCTURE, disclose that a thin film magnetic head is provided in which a magnetic yoke assembly is built up, layer by layer, atop a substrate using semiconductor thin film techniques. A lower yoke assembly is first fabricated including a lower magnetic layer situated on the substrate and first and second side poles are built up vertically from the ends of the lower magnetic layer. An insulative pedestal surrounded by a frame is disclosed as being formed at the top of the lower yoke assembly and extends above the uppermost lateral plane of the yoke assembly. A diamond-like carbon (DLC) wear layer is deposited atop the pedestal. First and second pole wells are disclosed as being excavated in the DLC layer so as to expose the first and second side poles therebelow and to form a DLC gap region between the first and second side poles. First and second magnetic poles are then formed in the first and second pole wells, respectively.

U.S. Pat. No. 4,601,099 to Toyoo Nishiyama, entitled METHOD FOR MANUFACTURING A MAGNETIC HEAD, discloses a magnetic head that is made by forming a first half core having at least two substantially parallel plane surfaces and one lateral surface, the distance between the two plane surfaces being equal to or greater than a predetermined track width fixing one of the two place surfaces of the first half core on part of one plane surface of a nonmagnetic substrate so that the one lateral surface of the first half core meets with the one plane surface of the substrate. A magnetic insulator is deposited to a substantially uniform thickness on the other of the two plane surfaces and the one lateral surface of the first half core and the remaining part of the one plane surface of the substrate, thereby forming a gap spacer, depositing the same material for the first half core to a substantially uniform thickness on the gap spacer film, thereby forming a second half core having a thickness equal to or greater than the predetermined track width, and removing at least part of the gap spacer film lying on the other plane surface of the first half core and part of the second half core lying on the part of the gap spacer film to be removed from the other plane surface of the first half core, thereby forming a magnetic head.

U.S. Pat. No. 5,754,377 to Robert G. Gray et al., entitled THIN FILM MAGNETIC HEAD INCLUDING AN ELEVATED GAP STRUCTURE, disclose a thin film magnetic head in which a magnetic yoke assembly is built up, layer by layer, atop a substrate using semiconductor thin film techniques. A lower yoke assembly is disclosed as being first fabricated including a lower magnetic layer situated on the substrate and first and second side poles are built up vertically from the ends of the lower magnetic layer. An insulative pedestal surrounded by a frame is formed at the top of the lower yoke assembly and extends above the uppermost lateral plane of the yoke assembly. A diamond-like carbon (DLC) wear layer is deposited atop the pedestal. It is disclosed that first and second pole support wells are excavated in the DLC layer so as to expose the first and second side poles therebelow, and further to receive first and second pole supports, respectively, therein. First and second pole extension members are situated on the first and second pole support members, respectively, with a non-magnetic gap region being situated between the first and second pole extension members. A second DLC layer is situated in the same plane as the non-magnetic gap region and the first and second pole extension member. The second DLC layer substantially surrounds the first and second side pole extensions and the gap region. In this manner, the gap region is elevated above the plane of the first and second pole support members and is protected from undesired head wear.

U.S. Pat. No. 5,801,909 to Robert G. Grayetal., entitled THIN FILM MAGNETIC HEAD INCLUDING DURABLE WEAR LAYER AND NON-MAGNETIC GAP STRUCTURES, disclose that a thin film magnetic head is fabricated on a substrate by depositing a seed layer on the substrate. A lower magnetic layer is disclosed as being plated on the substrate in an opening provided in an insulative layer which is deposited on the seed layer. A plurality of magnetic layers are plated at one end of the lower magnetic layer to build-up and form a first side pole by using the above seed layer as a seed. Another plurality of magnetic layers are disclosed as being plated at the other end of the lower magnetic layer to build-up and form a second side pole by using the same seed layer as a seed. The first and second side poles thus formed include upper and lower ends, the lower ends being plated to the ends of the lower magnetic layer. A first upper pole is plated to the upper end of the first side pole and, first upper pole includes a gap end facing the second side pole. It is disclosed that a gap region of nonmagnetic material is deposited adjacent the gap end of the first upper pole. A second upper pole is plated to the upper end of the second side pole and includes a gap end adjacent the gap region. A diamond-like carbon (DLC) frame is fabricated at the uppermost portion of the head surrounding the upper side poles and gap region. It is disclosed that the DLC frame provides both structural integrity to the head and wear protection when the head contacts the media surface.

SUMMARY OF THE INVENTION

It is therefore an object of the present invention to provide a head gap forming method for preventing a gap of a planar silicon head from increasing or being transformed.

It is another object of the present invention to provide a gap forming method for increasing adhesive strength between a gap spacer and an upper pole piece of a planar silicon head.

It is still another object of the present invention to provide a gap forming method for preventing characteristic degradation of a head caused by the contamination of a gap.

It is a further object of the present invention to provide an improved method for forming a gap spacer so as not to be curved or broken.

In order to achieve the above and other objects, a method for forming a gap of a planar thin film magnetic head, includes the steps of: depositing a photoresist to a thickness corresponding to the length of a gap spacer over one side of a pedestal-shape layer from the center of the pedestal-shape layer for supporting the gap formed by the gap spacer, the pedestal-shape layer having an upwardly extending stepped configuration and extending horizontally in a right direction and in a left direction; depositing a diamond-like carbon layer which is used as the gap spacer, the diamond-like-carbon layer having a strong affinity for upper pole pieces of a magnetic yoke, over the photoresist and the pedestal-shape layer; etching a part of the diamond-like carbon layer by using the diamond-like carbon layer of a side well of the photoresist and the diamond-like carbon layer on the photoresist as a mask; depositing a first magnetic layer for forming one of the upper pole pieces over the pedestal-shape layer exposed by the etching step; etching the diamond-like carbon layer on the photoresist except the diamond-like carbon layer of the side well of the photoresist and etching the photoresist; and depositing a second magnetic layer for forming another of the upper pole pieces over the pedestal-shape layer exposed by the step of etching the photoresist thereby forming the planar thin film magnetic head.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 2 through 7 are cross-sectional views showing gap forming processes of a planar silicon thin film magnetic head and a planar silicon head according to preferred embodiments of the present invention.

DETAILED DESCRIPTION OF THE PREFERRED EMBODIMENTS

Figure 1:
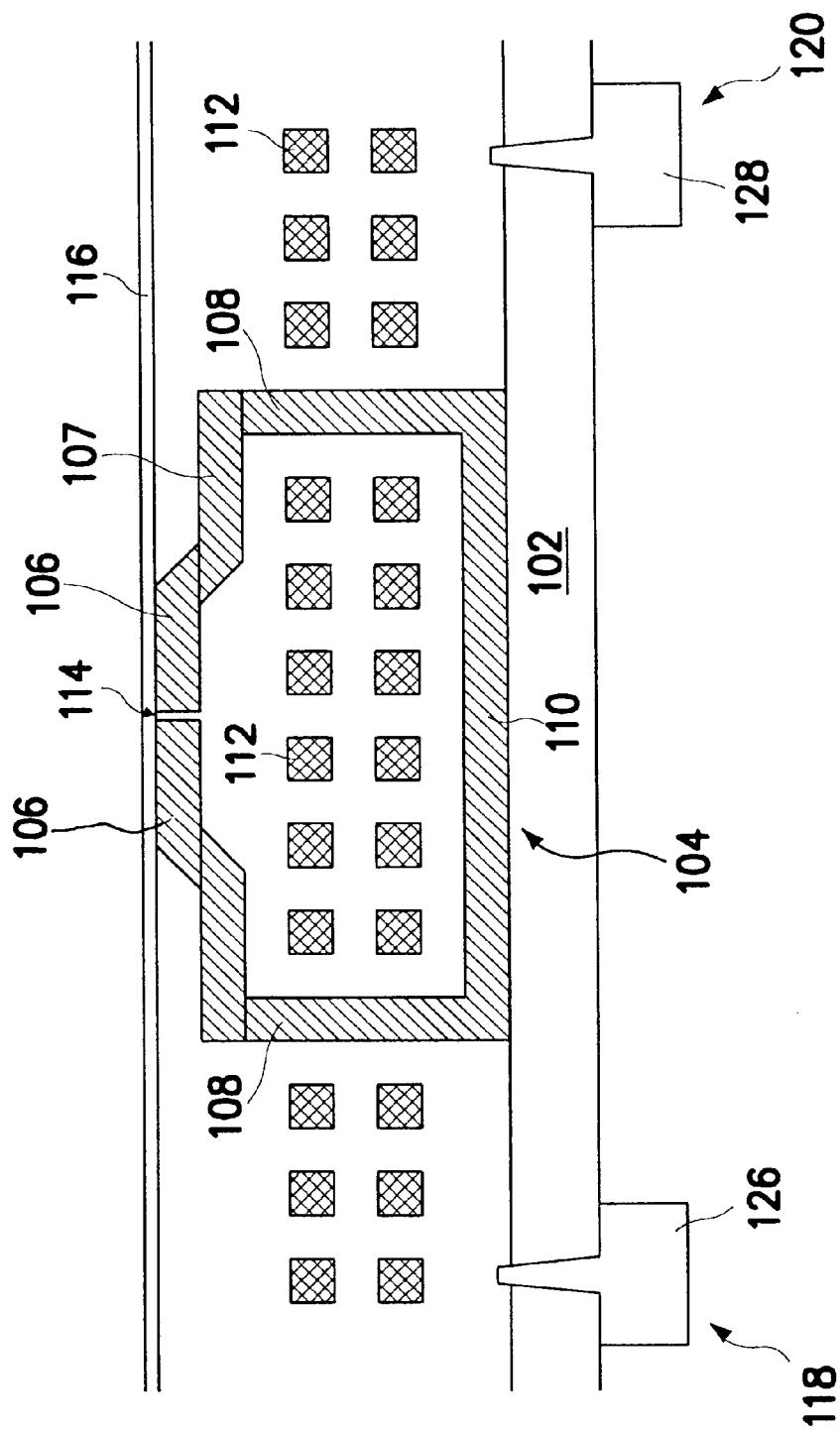
FIG. 1 is a cross-sectional view of a planar silicon head.

A cross-sectional view of a planar silicon head is shown in FIG. 1 for an understanding of preferred embodiments of the present invention. Referring to FIG. 1, a magnetic yoke 104 having an upper pole piece (UPP) 106, a concentrator 107, a pillar 108 and a lower pole piece (LPP) 110 is formed on a substrate 102, such as a silicon substrate, for example. The material of the magnetic yoke 104 is permalloy (NiFe) of a magnetic material. The pillar 108 of the magnetic yoke 104 is wound with a coil 112. A read/write gap 114 for reading and writing data is formed between pole tips of the two separated upper pole pieces (UPPs) 106. A diamond-like carbon (DLC) coated layer 116 is formed at the upper portions of the read/write gap 114 and the upper pole pieces (UPPs) 106. The back side of the silicon substrate 102 has head connectors 118 and 120 for electrically connecting the head to an external device. Bumps 126 and 128 connected to a suspension of an actuator are formed at the head connectors 118 and 120, respectively.

To manufacture the planar silicon head of FIG. 1, four processes are typically needed: a drilling process, an electroplating process, a gap forming process, and a bump process. The drilling process is for drilling holes in the silicon substrate 102 to form an electrode. The electroplating process is for implementing electroplating to form the upper pole piece (UPP) 106, the concentrator 107, the pillar 108, the lower pole piece (LPP) 110, and so forth. The gap forming process is for forming the gap 114. The bump process is for forming the bumps 126 and 128 at the back of the head for the electrical connection of the silicon head.

However, the planar silicon head of FIG. 1 can still have problems, in that, since an oxide spacer is formed at the side well of a thick photoresist and then the permalloy is deposited around the spacer at a time by a permalloy electroplating process to form the upper pole piece (UPP), the spacer can be curved or broken. Furthermore, in that the material of the gap is an oxide layer, the gap can be contaminated by its properties. Also, the width of the gap can be enlarged under typical temperature and humidly, 46° C., 85% for example, and the length thereof, as a result, is not necessarily uniform.

Figure 2:
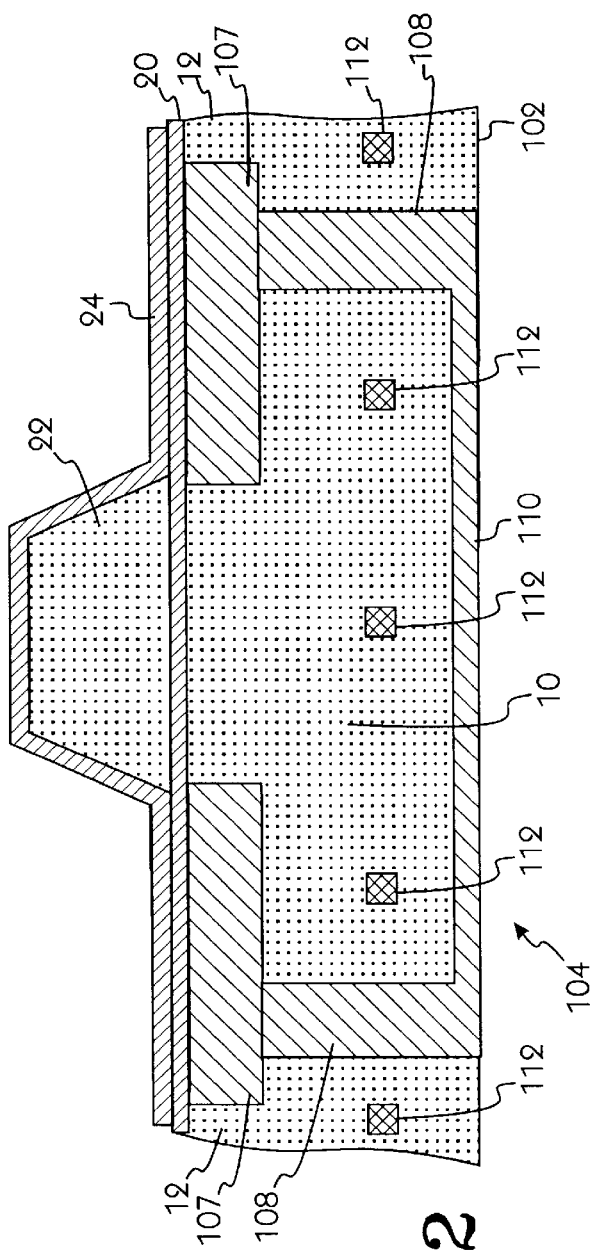

Referring to FIGS. 2 through 7, gap forming processes of a planar silicon head and a planar silicon head according to the present invention will be described together with processes for forming the upper pole piece (UPP) 106 shown in FIG. 1. In the magnetic yoke 104 shown in FIG. 1, the coils 112 are formed as shown in FIG. 1. Referring to FIG. 2, an insulation layer such as, for example, a silicon oxide layer ($SiO_2$) 10 is formed at areas except the coils 112, as indicated in FIG. 2. Continuing with reference to FIG. 2, an insulation layer 12, such as a silicon oxide layer ($SiO_2$) for example, is formed at the outside of the pillar 108 of the magnetic yoke 104. The concentrator 107 which is formed on the pillar 108 of the magnetic yoke 104 and horizontally extended is separated into two parts by the insulation layers 10 and 12, as indicated in FIG. 2. The magnetic yoke 104 of FIGS. 2 through 7 is illustrated in FIG. 2 and also includes a lower pole piece (LPP) 110 formed on a substrate 102 such as a silicon substrate, for example, similar to FIG. 1, with magnetic yoke 104 being indicated in FIGS. 3 through 7. A first conductive layer 20 such as a tungsten (W) mateiral is deposited over the concentrator 107 and the insulation layer 12. A pedestal or pedestal-shape layer 22 for supporting a gap spacer is formed over the first conductive layer 20 between the concentrators 107. The pedestal or pedestal-shape layer 22 includes an insulation layer, such as of a silicon oxide material or a silicon oxide layer, for example. The pedestal-shape layer 22 has an upwardly extending stepped configuration of a generally convex-like shape and horizontally extends in a right direction and in a left direction, as illustrated in FIGS. 2 through 7. A second conductive layer 24 such as a tungsten (W) material is deposited over the whole resultant surface, including over the pedestal or pedestal-shape layer 22 and over the first conductive layer 20.

Figure 3:
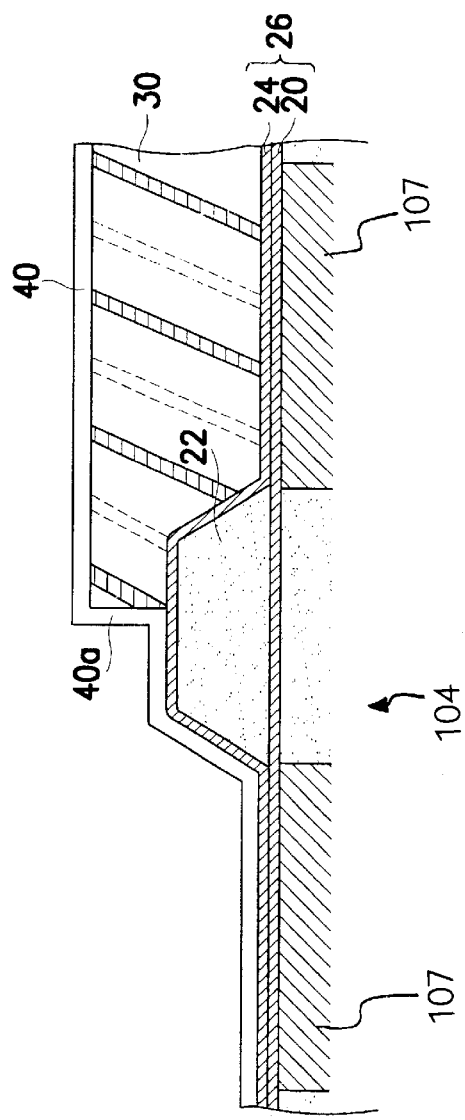

Continuing with reference to FIG. 3, a thick photoresist 30 of about 3 µm in thickness, for s example, is deposited over a conductive layer 26, conductive layer 26 including the first and second conductive layers 20 and 24, and the photoresist 30 is selectively etched to leave photoresist 30 at the right from the center of the pedestal or pedestal-shape layer 22, as shown in FIG. 3. To form the gap spacer, a diamond-like carbon (DLC) layer 40 is deposited to a thickness of 0.3 µm, for example, over the exposed conductive layer 26 and the photoresist 30, as illustrated in FIG. 3. The diamond-like carbon (DLC) has a strong affinity for the upper pole piece (UPP) 106 shown in FIG. 1. Again referring to FIG. 3, a diamond-like carbon (DLC) layer 40a deposited at the side well of the photoresist 30 will be the gap spacer and has a thickness of about 0.21 µm, for example. The diamond-like carbon (DLC) layer 40a has excellent properties in coating ability, adhesive strength, and lubrication. Moreover, the diamond-like carbon (DLC) also has excellent electric properties (for example, high electric resistivity) demanded as a read/write gap. While a read/write gap material such as $SiO_2$ has resistivity of 0.4 Ωcm, the diamond-like carbon (DLC) has resistivity of $10^{10}$–$10^{13}$ Ωcm, for example.

Continuing with reference to FIG. 4, a photoresist 42 is deposited over the resultant surface of FIG. 3 and then photoresist 42 is selectively etched by using the upper portions of the diamond-like carbon (DLC) layer 40a and the diamond-like carbon (DLC) layer 40 formed over the photoresist 30 as a mask. The exposed diamond-like carbon (DLC) layer 40 is also etched. Therefore, after this etching there results a structure having the diamond-like carbon (DLC) layer 40a formed at the side well of the photoresist 30, the photoresist 30, the DLC layer 40 and the photoresist 42 formed at the right from the center of the pedestal or pedestal-shape layer 22, as illustrated in FIG. 4.

Continuing further with reference to FIG. 5, a part of the conductive layer 26 exposed by the selective etching of the diamond-like carbon (DLC) layer 40 is etched, as indicated in FIG. 5. A magnetic layer 50a corresponding to ons side of the upper pole piece (UPP) 106 shown in FIG. 1 is formed over the resultant surface at the left from the center of the pedestal or pedestal-shape layer 22. The magnetic material for magnetic layer 50a is a permalloy, such as a nickel iron (NiFe) permalloy, for example. The magnetic layer 50a is formed by an electro-plating process.

Figure 6:
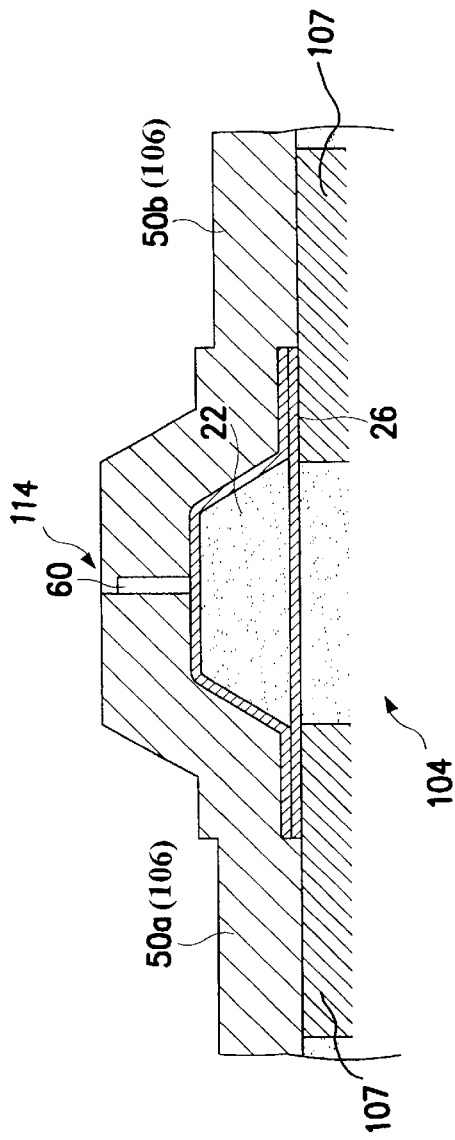

Continuing with reference to FIG. 6, the photoresist 42, the diamond-like carbon (DLC) layer 40 and the photoresist 30 are etched, as indicated in FIG. 6. A part of the conductive layer 26 exposed by the etching process of the photoresist 30 is etched, as shown in FIG. 6. A magnetic layer 50b corresponding to the other side of the upper pole piece (UPP) 106 shown in FIG. 1 is formed over the resultant surface at the right from the center of the pedestal or pedestal-shape layer 22, as illustrated in FIG. 6. The magnetic material of magnetic layer 50b is a permalloy such as a nickel iron (NiFe) permalloy, for example. A diamond-like carbon (DLC) layer 60 formed between the magnetic layers 50a and 50b is the gap spacer. Thus, the gap spacer formed by the diamond-like carbon (DLC) layer 60 corresponding to the read/write gap 114, and the upper pole piece (UPP) 106, corresponding to magnetic layers 50a and 50b, are formed, as illustrated in FIG. 6.

Figure 7:
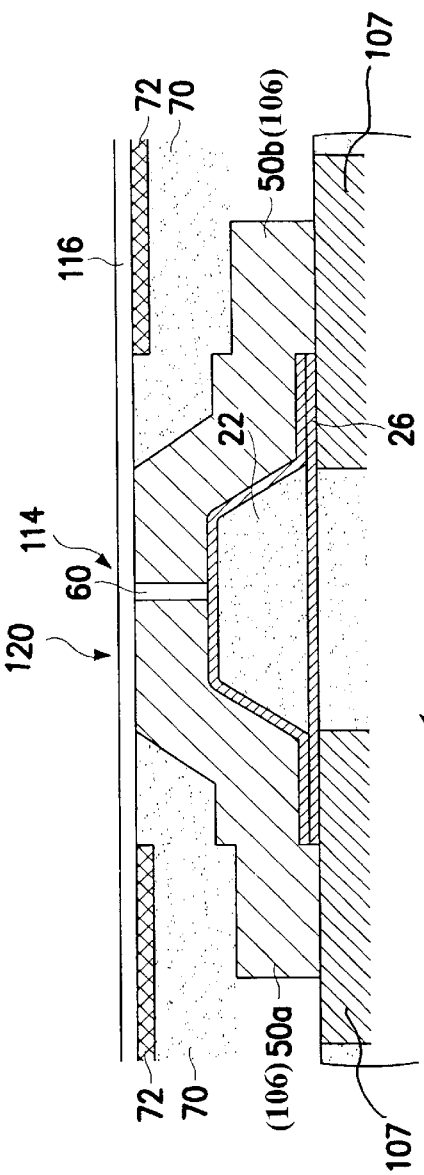

Now further continuing with reference to FIG. 7, after the gap spacer 60 and the upper pole piece (UPP) 106 including the magnetic layers 50a and 50b are formed, the magnetic layers 50a and 50b are selectively etched so that the magnetic layers 50a and 50b have the same upper surface as the gap spacer 60, as indicated in FIG. 7. An insulation layer 70, such as of a silicon oxide material, for example, is then deposited and selectively formed over the resultant surface, as illustrated in FIG. 7. A titanium tungsten (TiW) layer 72 is then selectively formed, and a diamond-like carbon (DLC) layer 116 for protecting the surface of the head 120 is formed.

As described above, a transformation problem of the gap which is generated when there is no affinity between the insulation layer of the gap spacer and the magnetic layer of the upper pole piece (UPP) can be prevented by the present invention by using the adhesive strength and coating ability of the diamond-like carbon (DLC). Further, by the present invention, the gap spacer can be prevented from being curved or broken by forming the upper pole piece (UPP) throughout by the above described steps. Also, in the present invention the contamination of the gap can be reduced since the diamond-like carbon (DLC) has good lubrication and high electric resistivity.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modification may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for forming a planar magnetic head, comprising the steps of:

forming a pedestal-shape layer, said pedestal-shape layer including an insulation material, and said pedestal-shape layer having an upwardly extending stepped configuration and extending horizontally from a center of said pedestal-shape layer in a right direction and in a left direction;

depositing a photoresist to a thickness corresponding to a length of gap spacer over one side of said pedestal-shape layer and from said center of said pedestal-shape layer;

depositing a diamond-like carbon layer over said photoresist and said pedestal-shape layer, said diamond-like carbon layer for forming said gap spacer and having a strong affinity for upper pole pieces of a magnetic yoke of said planar magnetic head;

etching a part of said diamond-like carbon layer by using the diamond-like carbon layer of a side well of said photoresist and the diamond-like carbon layer on said photoresist as a mask;

depositing a first magnetic layer for forming one of said upper pole pieces over said pedestal-shape layer on a surface exposed by said etching a part of said diamond-like carbon layer step;

etching again said diamond-like carbon layer on said photoresist except said diamond-like carbon layer of said side well of said photoresist and etching said photoresist; and depositing a second magnetic layer for forming another of said upper pole pieces over said pedestal-shape layer on a surface exposed by said step of etching said photoresist.

2. The method as claimed in claim 1, further comprising the steps of:
etching said first magnetic layer and said second magnetic layer so that said first magnetic layer and second magnetic layer have a same upper surface as an upper surface of said gap spacer;
depositing an insulation layer over at least a part of said first magnetic layer and said second magnetic layer; and
coating over a resultant surface formed by said depositing said insulation layer step with a diamond-like carbon material to protect said planar magnetic head.

3. The method as claimed in claim 2, further comprising the step of selectively forming a titanium tungsten layer in said insulation layer.

4. The method as claimed in claim 3, wherein said insulation material of said pedestal-shape layer and said insulation layer comprise a silicon oxide material, and said first magnetic layer and said magnetic layer comprise a nickel iron permalloy.

5. The method as claimed in claim 4, wherein said diamond-like carbon layer has a resistivity of $10^{10}$ to $10^{13}$ $\Omega$cm.

6. The method as claimed in claim 5, wherein a layer of a conductive material is deposited over said pedestal-shape layer.

7. The method as claimed in claim 2, wherein said insulation material of said pedestal-shape layer and said insulation layer comprise a silicon oxide material, and wherein said first magnetic layer and said second magnetic layer comprise a nickel iron permalloy.

8. The method as claimed in claim 7, wherein said diamond-like carbon layer has a resistivity of $10^{10}$ to $10^{13}$ $\Omega$cm.

9. The method as claimed in claim 1, wherein a layer of a conductive material is deposited over said pedestal-shape layer.

10. The method as claimed in claim 9, wherein said insulation material of said pedestal-shape layer comprises a silicon oxide material, said layer of a conductive material comprises a tungsten material, and said first magnetic layer and said second magnetic layer comprise a nickel iron permalloy.

11. The method as claimed in claim 10, wherein said diamond-like carbon layer has a resistivity of $10^{10}$ to $10^{13}$ $\Omega$cm.

12. A method for forming a planar magnetic head, comprising the steps of:
forming a photoresist having a stepped surface at one side of and from a center of a gap spacer pedestal;
forming a gap spacer of a diamond-like carbon material having a strong affinity for pole pieces of a magnetic yoke of said planar magnetic head at a side well of said photoresist;
forming one side of an upper pole piece with a magnetic material over another side of and from the center of said gap spacer pedestal, said one side of said upper pole piece being formed adjacent said gap spacer; and
etching said photoresist and forming another side of said upper pole piece with a magnetic material over the gap spacer pedestal on a surface exposed by the step of etching said photoresist, said another side of said upper pole piece being formed adjacent said gap spacer.

13. The method as claimed in claim 12, wherein said gap spacer pedestal comprises an insulation material.

14. The method as claimed in claim 13, wherein a layer of a conductive material is deposited over said gap spacer pedestal.

15. The method as claimed in claim 14, wherein said insulation material of said gap spacer pedestal comprises a silicon oxide material, said layer of said conductive material comprises a tungsten material, and wherein said magnetic material of said one side of said upper pole piece and said magnetic material of said another side of said upper pole piece comprise a nickel iron permalloy.

16. The method as claimed in claim 15, wherein said diamond-like carbon material has a resistivity of $10^{10}$ to $10^{13}$ $\Omega$cm.

17. The method as claimed in claim 13, wherein said insulation material of said pedestal-shape layer comprises a silicon oxide material, and wherein said magnetic material of said one side of said upper pole piece and said magnetic material of said another side of said upper pole piece comprise a nickel iron permalloy.

18. The method as claimed in claim 17, wherein said diamond-like carbon material has a resistivity of $10^{10}$ to $10^{13}$ $\Omega$cm.

19. A method for forming a planar magnetic head, comprising the steps of:
depositing a diamond-like carbon material over one side of a lower pedestal-shape layer at a gap forming position and over a photoresist formed over another side of said lower pedestal-shape layer to form a gap spacer of said diamond-like carbon material at a side well of said photoresist;
etching said diamond-like carbon material formed over said one side of said lower pedestal-shape layer and depositing a magnetic material over said lower pedestal-shape layer on a surface exposed by said etching of said diamond-like carbon material to form one side of an upper pole piece;
etching again said diamond-like carbon material formed over said photoresist and etching said photoresist; and
depositing a magnetic material over the lower pedestal-shape layer on a surface exposed by said etching again said diamond-like carbon material step to form another side of said upper pole piece.

20. The method as claimed in claim 19, wherein said lower pedestal-shape layer comprises an insulation material.

21. The method as claimed in claim 20, wherein a layer of a conductive material is deposited over said insulation material.

22. The method as claimed in claim 21, wherein said insulation material comprises a silicon oxide material, said layer of a conductive material comprises a tungsten material, said magnetic material forming said one side of said upper pole piece and said magnetic material forming said another side of said upper pole piece comprise a nickel iron permalloy.

23. The method as claimed in claim 22, wherein said diamond-like carbon material has a resistivity of $10^{10}$ to $10^{13}$ $\Omega$cm.

24. The method as claimed in claim 20, wherein said insulation material comprises a silicon oxide material, and said magnetic material forming said one side of said upper pole piece and said magnetic material forming said another side of said upper pole piece comprise a nickel iron permalloy.

25. The method as claimed in claim 24, wherein said diamond-like carbon material has a resistivity of $10^{10}$ to $10^{13}$ $\Omega$cm.

* * * * *